United States Patent
Takada (10) Patent No.: US 12,412,962 B2
(45) Date of Patent: Sep. 9, 2025

(54) BATTERY PACK

(71) Applicant: HONDA MOTOR CO., LTD., Tokyo (JP)

(72) Inventor: Satoshi Takada, Tokyo (JP)

(73) Assignee: HONDA MOTOR CO., LTD, Tokyo (JP)

( * ) Notice: Subject to any disclaimer, the term of this patent is extended or adjusted under 35 U.S.C. 154(b) by 497 days.

(21) Appl. No.: 18/146,468

(22) Filed: Dec. 27, 2022

(65) Prior Publication Data

US 2023/0238656 A1 Jul. 27, 2023

(30) Foreign Application Priority Data

Jan. 27, 2022 (CN) .................. 202210097849.X (51) Int. Cl.
| | |
|---|---|
| *H01M 50/474* | (2021.01) |
| *H01M 10/613* | (2014.01) |
| *H01M 10/6557* | (2014.01) |
| *H01M 50/204* | (2021.01) |
| *H01M 50/289* | (2021.01) |
| *H01M 50/403* | (2021.01) |
| *H01M 50/48* | (2021.01) |

(52) U.S. Cl.
CPC ....... *H01M 50/474* (2021.01); *H01M 10/613* (2015.04); *H01M 10/6557* (2015.04); *H01M 50/204* (2021.01); *H01M 50/289* (2021.01); *H01M 50/403* (2021.01); *H01M 50/48* (2021.01)

(58) Field of Classification Search
None
See application file for complete search history.

(56) References Cited

U.S. PATENT DOCUMENTS

| | | | |
|---|---|---|---|
| 2019/0181404 A1* | 6/2019 | Seki | H01M 50/507 |
| 2023/0057595 A1* | 2/2023 | Vogel | H01M 10/653 |

FOREIGN PATENT DOCUMENTS

JP 2019106264 A 6/2019

* cited by examiner

*Primary Examiner* — Eli S Mekhlin (74) *Attorney, Agent, or Firm* — CKC & PARTNERS CO., LLC (57) ABSTRACT

A configuration is provided so as to enable efficient fixing of cell groups to a housing of a battery pack. A housing of a battery pack has inside thereof a partition wall which extends in an extending direction and projects in a projecting direction. A cell group has a plurality of battery cells side-by-side in the extending direction one a side of the partition wall. Paste is filled into a gap between the partition wall and the cell group. The partition wall has an injection channel. The injection channel has an injection port for injecting the paste, and an inlet which communicates with the injection port and opens to the gap.

4 Claims, 13 Drawing Sheets

BATTERY PACK

This application is based on and claims the benefit of priority from Chinese Patent Application No. CN202210097849.X, filed on 27 Jan. 2022, the content of which is incorporated herein by reference.

BACKGROUND OF THE INVENTION

Field of the Invention

The present invention relates to a battery pack having a plurality of battery cells.

Related Art

In recent years, from the viewpoint of decreasing the emission of carbon dioxide, reducing the negative impact on the global environment, etc., the popularization of electric vehicles such as EV and HEV has been progressing. For the battery pack equipped to an electric vehicle or the like, technology for expanding the occupied area by battery cells within the battery pack, and thus equipping many battery cells has been necessitated.

More specifically, conventionally, a battery module has been formed by combining a plurality of battery cells, and further, a battery pack has been formed by mounting a plurality of these battery modules in a housing. Such a battery module has a strong structure due to accomplishing the retention and binding of the battery cells with a single battery module. In contrast, technology has been of focus which forms a battery pack by abolishing or simplifying the battery module and mounting a plurality of cell groups consisting of a plurality of battery cells as is into the housing. At this time, the retaining and binding of the battery cells is first accomplished by the cell groups being assembled in the housing.

Patent Document 1: Japanese Unexamined Patent Application, Publication No. 2019-106264

SUMMARY OF THE INVENTION

For such a battery pack, there is room for further improvement, and thus the present inventors have focused on the point that, if able to efficiently fix the cell group to the housing, the production of the battery pack is accelerated, and the quality of the battery pack improves.

The present invention has been made taking account of the above situation, and has an object of configuring so as to be able to efficiently fix a cell group to a housing.

The present inventors found that it is possible to efficiently fix a cell group to a housing so long as providing an injection channel for injecting paste to a partition wall of a housing, and injecting the paste from this injection channel to a gap between the partition wall and the cell group, thereby arriving at the present invention. The present invention is a battery pack according to the following first to fifth aspects.

A battery pack according to a first aspect of the present invention includes:
 a housing having inside thereof a partition wall extending in an extending direction and projecting in a projecting direction which is orthogonal to the extending direction;
 a cell group having side-by-side in the extending direction a plurality of battery cells on a side of the partition wall; and
 paste filled into a gap between the partition wall and the cell group,
 wherein the partition wall includes an injection channel having an injection port for injecting the paste, and an inlet which communicates with the injection port and opens to the gap.

According to the first aspect of the present invention, by injecting paste to the injection port of the partition wall, and extracting paste from the inlet to the gap between the partition wall and cell group, it is possible to efficiently pour paste into this gap. It is thereby possible to efficiently fix the cell group to the housing.

According to a second aspect of the present invention, in the battery pack as described in the first aspect, the injection port is provided at an end face on a side in the projecting direction of the partition wall, and the inlet is provided more to an opposite direction side of the projecting direction than a center in the projecting direction of a wall face of the partition wall on a side of the cell group.

According to the second aspect of the present invention, the injection port is at an end face of the partition wall on a side in the projecting direction, the access from injection equipment is favorable. Moreover, since the inlet is more to an opposite direction side of the projecting direction than the center in the projecting direction of the partition wall, it is possible to actively lead the paste to the back of the gap. For this reason, it is possible to make the paste uniform by efficiently evacuating the air inside the gap.

According to a third aspect of the present invention, the battery pack as described in the first or second aspect further includes a plate extending in the extending direction along a lateral face of the cell group, in which the plate includes a flange abutting an end face of a plurality of the battery cells on a side in the projecting direction, and a fixed part which is fixed to an end face of the partition wall on a side in the projecting direction.

According to the third aspect of the present invention, by the flange abutting the end face of the plurality of battery cell on a side in the projecting direction, and the fixed part being fixed to the partition wall, it is possible to position and retain the plurality of battery cells in the projecting direction.

According to a fourth aspect of the present invention, in the battery pack as described in the third aspect, the plate includes at intervals in the extending direction a plurality of protrusions projecting to a side of the partition wall within the gap.

According to the fourth aspect of the present invention, by the plurality of protrusions provided side-by-side in the extending direction, it is possible to secure the gap between the plate and wall surface and it becomes easy to arrange the cell group at the desired position in a lateral direction. In this state, by pouring the paste between the partition wall and cell group, the cell assembly tends to be positioned and retained at the desired position in a lateral direction.

According to a fifth aspect of the present invention, in the battery pack as described in the third aspect, the plate connects the battery cells by being attached to a lateral face of the plurality of the battery cells.

According to the fifth aspect of the present invention, since the battery cells are connected by the plate, it is possible to efficiently assemble the cell group to the housing compared to a case of not connecting thereby. Moreover, this connection simply attaches the plate to a lateral face of a plurality of battery cells, it can be carried out easily, and leads to an improvement in productivity of the battery pack. Furthermore, after assembly of the cell group to the housing, since the cell group is fixed to the housing by paste or the like, there is no particular problem even if the plate distances from the plurality of battery cells. For this reason, this assembly is simple, and this point leads to an improvement in the productivity of the battery pack.

According to the present invention, it is possible to efficiently fix a cell group to a housing.

DETAILED DESCRIPTION OF THE INVENTION

Hereinafter, embodiments of the present invention will be explained while referencing the drawings. However, the present invention is not to be limited in any way to the following embodiments, and can be realized by appropriately modifying within a scope not departing from the gist of the present invention.

First Embodiment

Figure 1:
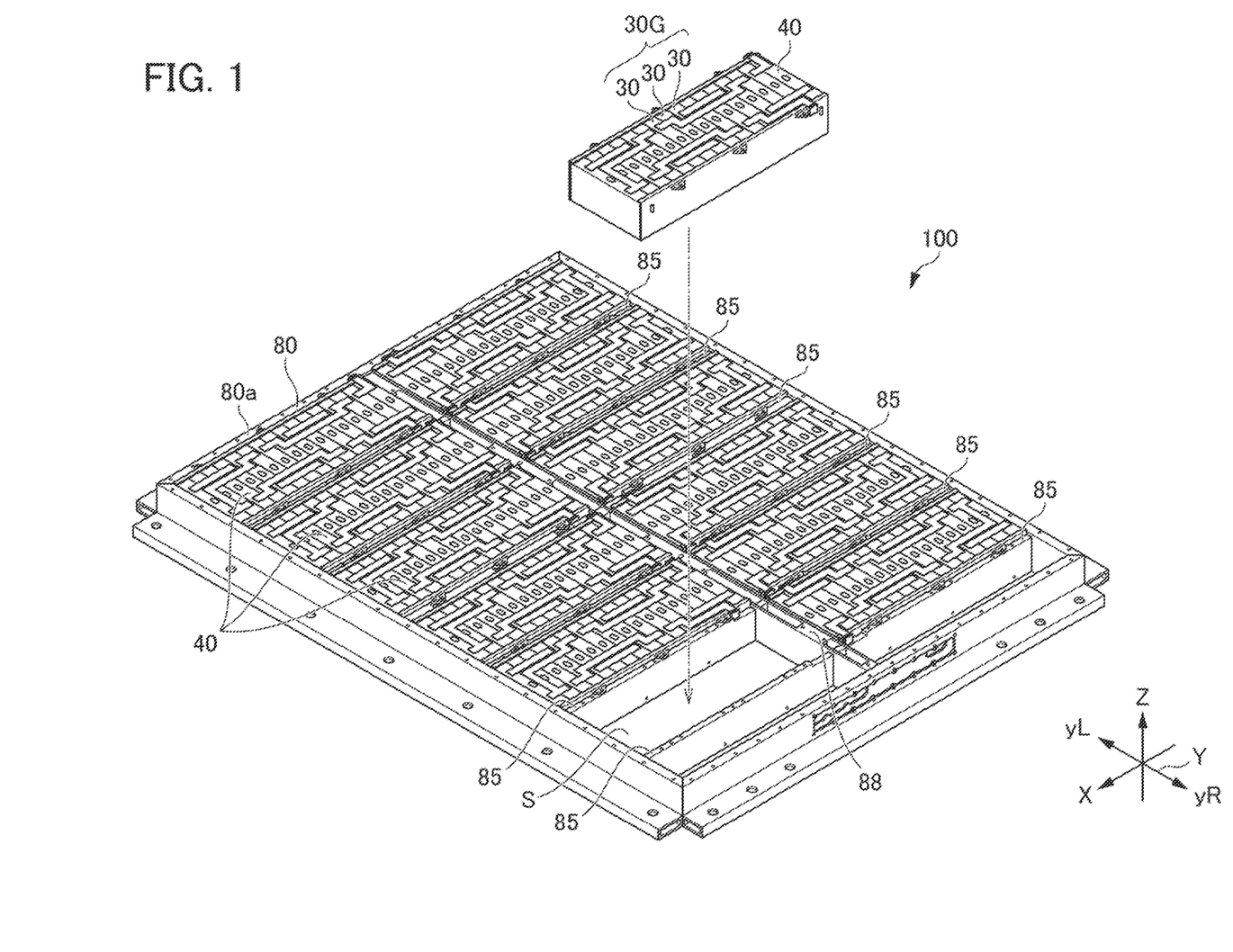
FIG. 1 is a perspective view showing a battery pack of a first embodiment.

FIG. 1 is a perspective view showing a battery pack 100 of the present embodiment. The battery pack 100 has a housing 80, and a plurality of cell assemblies 40 equipped to the housing 80.

Hereinafter, the predetermined three directions which are orthogonal to each other are respectively referred to as "front/rear direction X", "left/right direction Y" and "up/down direction Z". Consequently, the front/rear direction X referred to herein does not necessary indicate the vehicle longitudinal direction, i.e. front/rear direction of the vehicle. More specifically, the front/rear direction X may be the vehicle longitudinal direction, or may be the vehicle width direction, for example. It should be noted that "front/rear direction X", "left/right direction Y" and "up/down direction Z" may be replaced with "extending direction", "lateral direction" and "projecting direction", respectively.

The housing 80 has a rectangular housing main body 80a which opens upwards, and a lid (not illustrated) which seals this opening of the housing main body 80a. The inner side of the housing 80 is divided into a plurality of installation spaces S, by a partition wall 88 projecting upwards from the inner bottom face of the housing main body 80a and extending in the left/right direction Y, and a plurality of partition walls 85 projecting upwards from the inner bottom face of the housing main body 80a and extending in the front/rear direction X. One cell assembly 40 is equipped into each installation space S.

Figure 2:
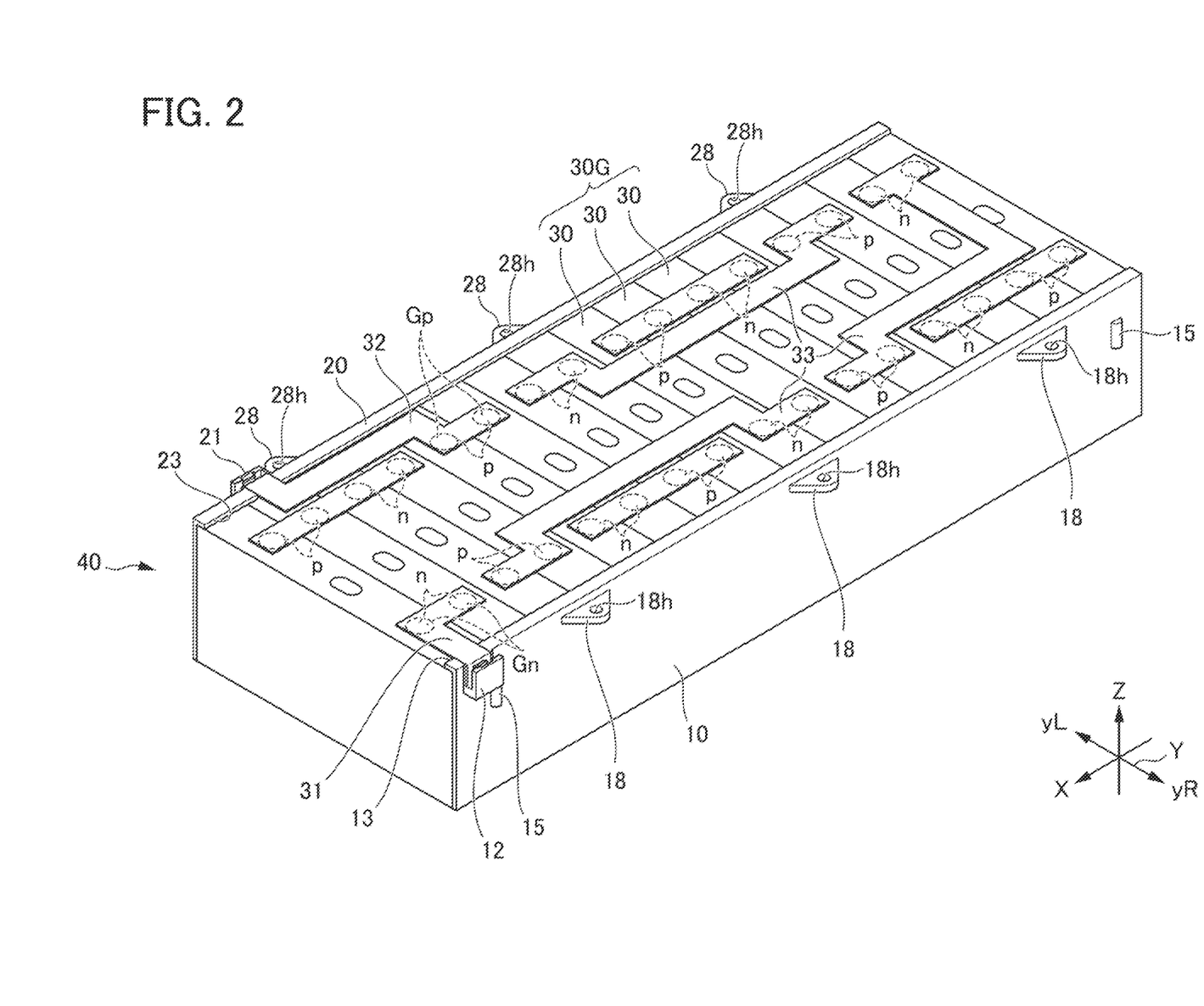
FIG. 2 is a perspective view showing a cell assembly.

FIG. 2 is a perspective view showing the cell assembly 40. The cell assembly 40 has a cell group 30G, first plate 10 and second plate 20. The cell group 30G has a plurality of battery cells 30 side-by-side in the front/rear direction X. The first plate 10 and second plate 20 extend in the front/rear direction X. The first plate 10 connects the right-side faces of the battery cells 30, by being attached to the right-side face of each battery cell 30 of the cell assembly 40 to which it belongs by way of adhesive, double-sided top or the like. The second plate 20 connects left-side faces of the battery cells 30 by being attached to the left-side face of each battery cell 30 of the cell assembly 40 to which it belongs by way of adhesive, double-sided tape or the like. As the materials of the first plate 10 and second plate 20, a high strength resin possessing both an insulation property and mechanical strength is desirable.

The first plate 10 has a first flange 13, a first fixed part 18, a plurality of first protrusions 15, and a first terminal block 12. This first flange 13, first fixed part 18, first protrusion 15 and first terminal block 12 may be formed separately from the main body portion of the first plate 10, and assembled to the main body portions; however, they are preferably integrally formed with the main body portion.

The first flange 13 projects from the upper end of the first plate 10 laterally inwards, i.e. leftwards yL, and abuts the upper face of the cell group 30G. The first fixed part 18 projects from the right-side face upper part of the first plate 10 to laterally outwards, i.e. rightwards yR, and a bolt through-hole 18h piercing vertically is provided.

The first protrusion 15 is a protrusion for securing a gap g between the first plate 10 and a partition wall 85 adjacent thereto, and is arranged in parallel providing a space in the front/rear direction X at the right-side face upper part of the first plate 10. Each first protrusion 15 projects laterally outwards, i.e. rightwards yR, within this gap g. The first terminal block 12 protrudes from the upper part of the first plate 10 to laterally outwards, i.e. rightwards yR.

The second plate 20 has a second flange 23, a second fixed part 28, a plurality of second protrusions 25 and a second terminal block 21. The explanation for the second plate 20 is read by substituting terms in the explanation of the first plate 10 as follows. Namely, "first" is substituted for "second, and each of "right" and "left" is substituted with the other, and the reference number is substituted with the corresponding reference number. However, the first fixed part 18 and second fixed part 28 are provided at positions shifted in the front/rear direction X from each other, and similarly, the first terminal block 11 and second terminal block 21 are provided at positions shifted in the front/rear direction X from each other.

The adhesive strength of each plate 10, 20 to the cell group 30G is sufficient so long as having even the minimum strength and reliability that can withstand the subsequent handling in the assembly work of the cell assembly 40 to the housing 80. In addition, prior to the cell assembly 40 being assembled to the housing 80, it shall be handled with each battery cell 30 at low SOC, and thus charging is not carried out. This is because, by each battery cell 30 expanding from charging, there is concern over the adhesion of each plate 10, 20 to the cell group 30G peeling away. It should be noted that SOC is an abbreviation of "state of charge", and indicates the charge state of the battery, i.e. percentage of remaining capacity accounting for the capacity of the battery.

The cell assembly 40 further includes a plurality inter-cell bus bars 33, a first bus bar 31 and a second bus bar 32. The terminals p, n of the battery cell 30 are electrically connected by the inter-cell bus bar 33. More specifically, in the present embodiment, the plurality of battery cells 30 constituting the cell group 30G are connected 2 in parallel, i.e. series in two rows, by the plurality of inter-cell bus bars 33.

The negative electrode terminal n of the battery cell 30 on the lowest potential side constitutes the negative electrode terminal Gn of the overall cell group 30G. On the other hand, the positive electrode terminal p of the battery cell 30 on the highest potential side constitutes the positive electrode terminal Gp of the overall cell group 30G. The first bus bar 31 has one end electrically connected to the negative electrode terminal Gn of the overall cell group 30G, and the other end arranged within the first terminal block 12. The second bus bar 32 has one end electrically connected to the positive electrode terminal Gp of the overall cell group 30G, and the other end inserted into the second terminal block 21.

These bus bars 31 to 33 are mounted after adhesion of the plates 10, 20 to the cell group 30G. Furthermore, when a voltage detection line, temperature detection line, etc. omitted from the drawings are attached to the cell group 30G, and the insulation cover omitted from the drawings is attached to the upper face, etc. of the cell group 30G, the cell assembly 40 is completed.

Figure 3:
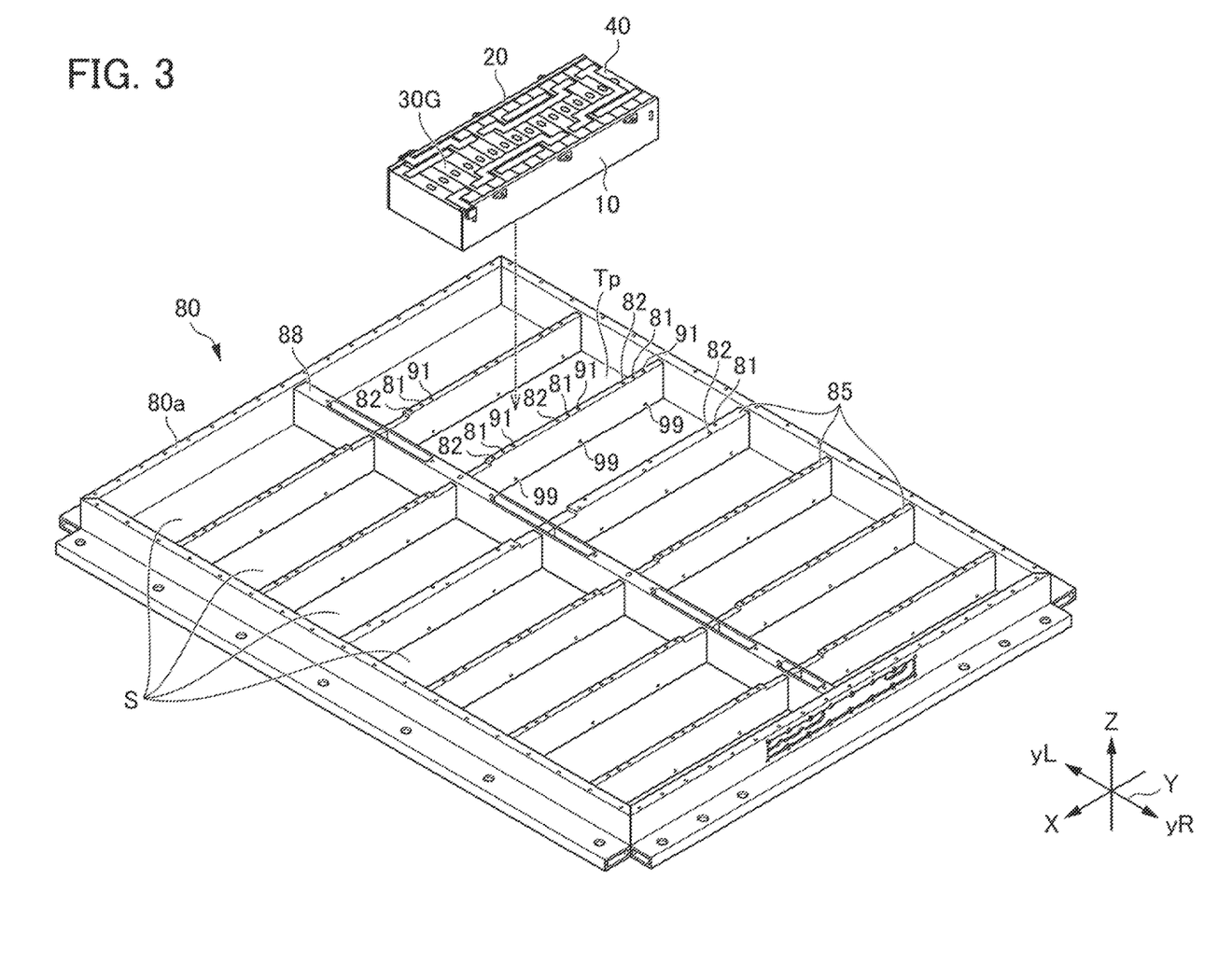
FIG. 3 is a perspective view showing an aspect upon assembling the cell assembly in a housing.

FIG. 3 is a perspective view showing an aspect upon mounting the cell assembly 40 in the installation space S. In a portion positioned below the installation space S of the housing 80, a coolant pipe omitted from the drawings is inlayed to cool the cell group 30G from the underside. Thermal conduction paste Tp is made to cover the inner bottom face of each installation space S in advance. However, it may be configured so as to install a heat transfer sheet in place of the thermal conduction paste Tp.

Figure 4:
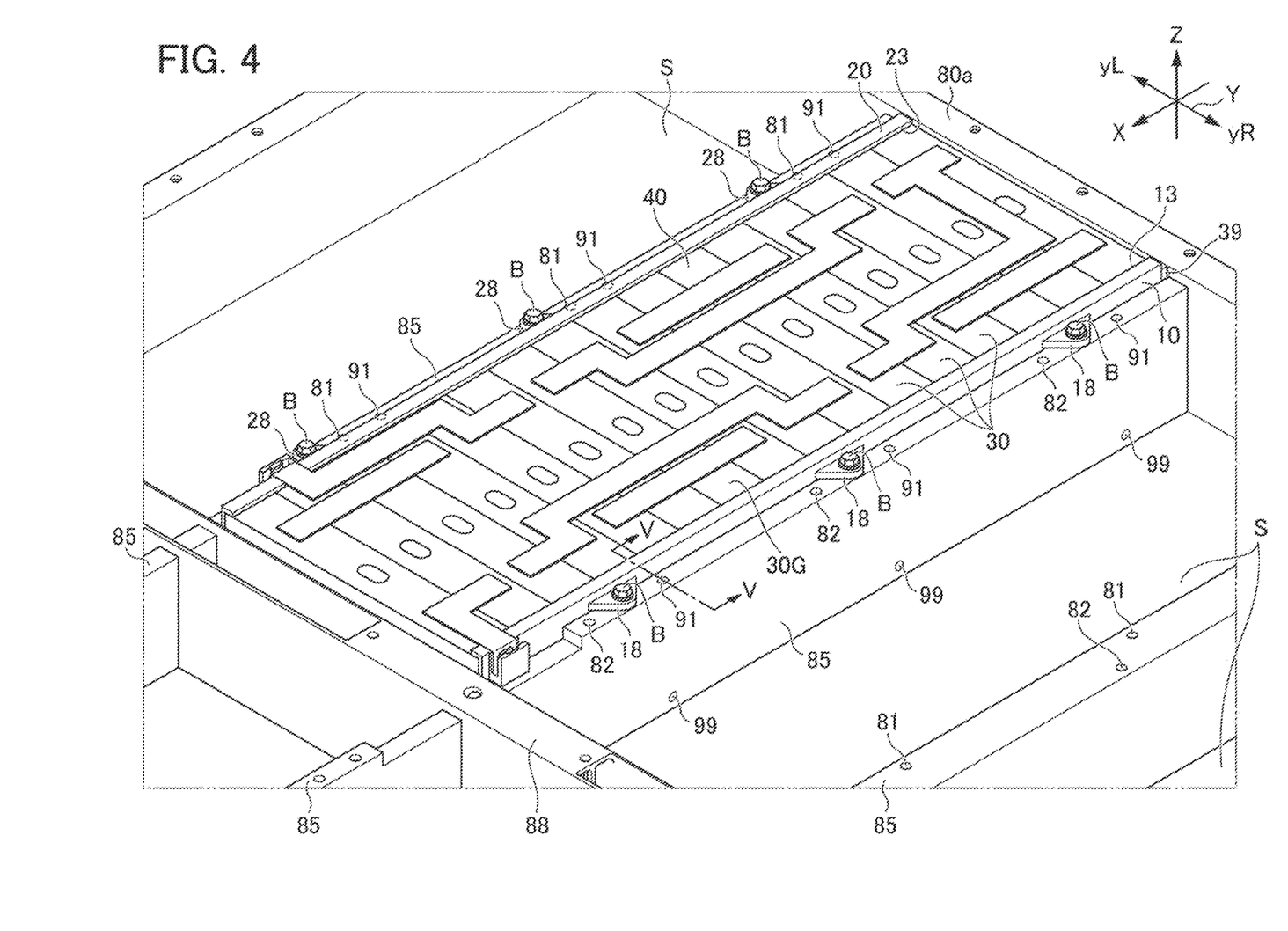
FIG. 4 is a perspective view showing a state in which the cell assembly is assembled in the housing.

FIG. 4 is a perspective view showing a state in which the cell assembly 40 is mounted in a installation space S. Next, positioning and retention in each of the directions X, Y, Z of the cell assembly 40 will be explained.

First, positioning and retention in the front/rear direction X will be explained. After inserting the cell assembly 40 in the installation space S, a shim 39 is inserted between one end in the front/rear direction X of the cell assembly 40 and the inner wall of the installation space S. At this time, the appropriate thickness shim 39 is selected so that the load in the front/rear direction X against the cell assembly 40 after insertion of the shim 39 becomes suitable, i.e. 1 to 2 kN, for example. The positioning and retention in the front/rear direction X of the cell assembly 40 thereby completes. It should be noted that it is desired to be a high strength resin possessing both strength and insulation property as the material of the shim 39.

Next, positioning in the up/down direction Z of the cell assembly 40 will be explained. The bolt B is made to insert into the bolt through hole 18h, 28h of the fixed parts 18, 28 of each plate 10, 20, and this bolt B is threaded in the bolt holes 81, 82 which is in the upper face of the partition wall 85, whereby the fixed parts 18, 28 are fastened to the upper face of the partition wall 85. Positioning and retention in the up/down direction Z of the cell assembly 40 are thereby completed.

In other words, the cell group 30G is retained in a downwards undisplaceable manner, by abutting to the inner bottom face of the load space S via the thermal conduction paste Tp on the lower face of the cell group 30G. Then, by abutting of the flanges 13, 23 to the upper face of the cell group 30G and fastening of the fixed parts 18, 28 to the upper face of the partition wall 85, the cell group 30G is retained in an upward undisplaceable manner. The cell assembly 40 is thereby positioned and retained in the up/down direction Z. It should be noted that, at this time, part of the thermal conduction paste Tp coated in advance on the bottom face of the installation space S goes around part of the gap g between the cell assembly 40 and partition wall 85.

Figure 5:
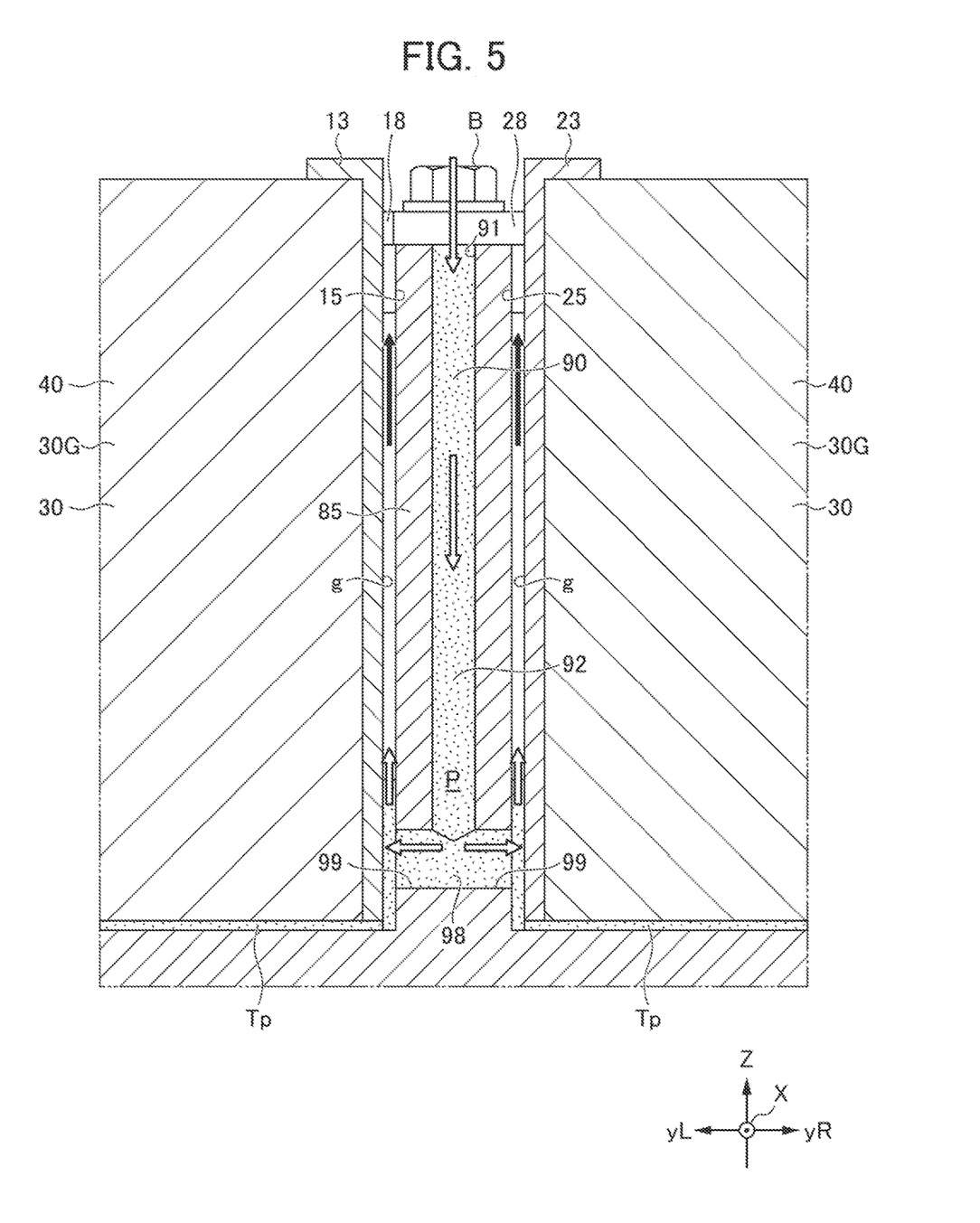
FIG. 5 is a cross-sectional view showing a cross section along a line V-V in FIG. 4.

FIG. 5 is a cross-sectional view showing a cross section along the line V-V in FIG. 4. Next, positioning in the left/right direction Y of the cell assembly 40 will be explained. As described above, the first plate 10 and second plate 20 include the protrusions 15, 25 for securing the gap g from each partition wall 85. For this reason, upon mounting the cell assembly 40 in the installation space S, the cell assembly 40 is centered in the left/right direction Y by the protrusions 15, 25 on both left and right sides. It should be noted that, due to the dimensional tolerance, etc. of the housing main body 80a, the protrusions 15, 25 can be crushed or shaved off during mounting of the cell assembly 40; however, these protrusions 15, 25 have an object of only centering of the cell assembly 40, and do not necessarily assume a retaining function of the cell assembly 40; therefore, there is no particular problem.

The partition wall 85 has an injection channel 90 for injecting the paste P into the gap g between the partition wall 85 and cell assembly 40. The paste P is resin or adhesive of a type having fluidity during injection, and which subsequently hardens irreversibly, or is a paste like these. The injection channel 90 has a vertical extension 92 which extends from an injection port 91 provided at the upper face of the partition wall 85 towards downwards, and a left/right extension 98 extending from a lower end of the vertical extension 92 to the left/right direction. The left end of the left/right extension 98 configures an inlet 99 on the left side opening at the left-side face of the partition wall 85, and a right end of the left/right extension 98 configures an inlet 99 on the right side opening at the right-side face of the partition wall 85. Each of the left/right inlets 99 communicates with the injection port 91, and opens to the gap g in the lower part or lower end of the partition wall 85.

During assembly of the cell assembly 40 to the housing 80, paste P is injected from the injection channel 90 to the gap g between the plates 10, 20 and partition wall 85. When this paste P hardens, positioning and retention in the left/right direction Y of the cell assembly 40 completes. It should be noted that the paste P has an object of retention of the cell assembly 40, and thus it is not a problem even if the paste P not particularly having thermal conductivity. In addition, the paste P does not need to fully fill the gap g, and is sufficient if filling at least the lower part of the gap g. This is because the upper parts of the plates 10, 20 are positioned and retained not only in the up/down direction Z, but also the left/right direction Y, by the fastening of the fixed parts 18, 28 relative to the upper face of the partition wall 85.

As above, the cell assembly 40 is positioned and retained in the respective directions X, Y, Z relative to the housing 80. It should be noted that adhesion of the battery cells 30 by the plates 10, 20 also contributes to retaining of the cell group 30G; however, it is not a problem even if adhesion is peeled apart after assembly of the cell assembly 40 to the housing 80. In addition, it is not a problem even if adhesive strength or adhesive force of the paste P is lost. This is because, as long as the solidified paste P still exists in the gap g, the positioning and retaining in the left/right direction Y of the cell assembly 40 will function.

Figure 6:
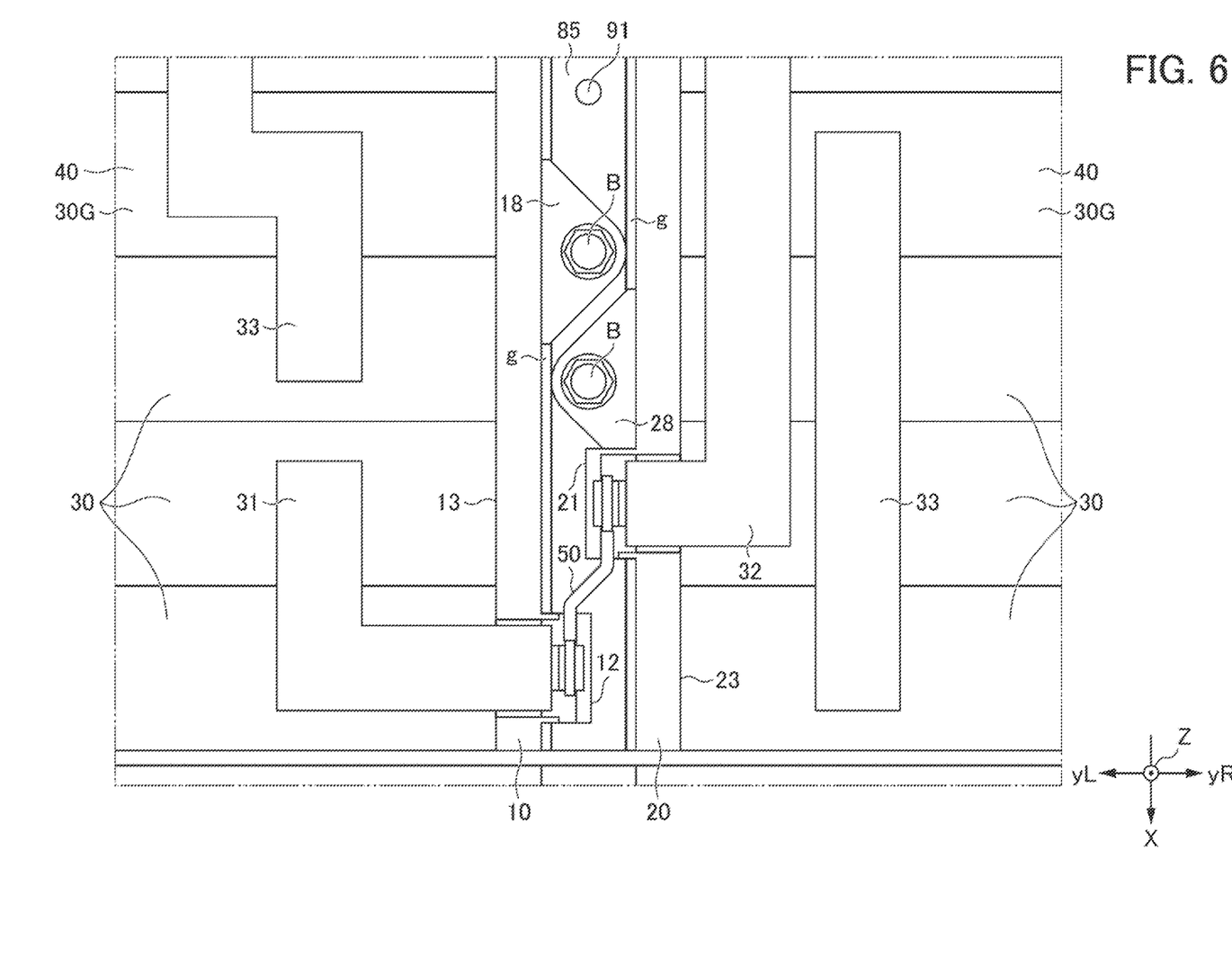
FIG. 6 is a plan view showing an electrical connection portion of adjacent cell assemblies.

FIG. 6 is a plan view from above of an electrical connection portion of adjacent cell assemblies 40 in the left/right direction Y and the vicinity thereof. The first terminal block 12 on the left-side cell assembly 40 and the second terminal block 21 on the right-side cell assembly 40 project directly above the same partition wall 85. A coupling bus bar 50 has one end inserted in the first terminal block 12 of the left-side cell assembly 40, and the other end inserted in the second terminal block 21 of the right-side cell assembly 40, whereby the left-side cell assembly 40 and right-side cell assembly 40 are electrically connected within the housing 80 and directly above the partition wall 85. In addition, stated differently, the coupling bus bar 50 electrically connects a "first cell group" as the cell group 30G of the left-side cell assembly 40, and a "second cell group" as the cell group 30G of the right-side cell assembly 40.

Figure 7:
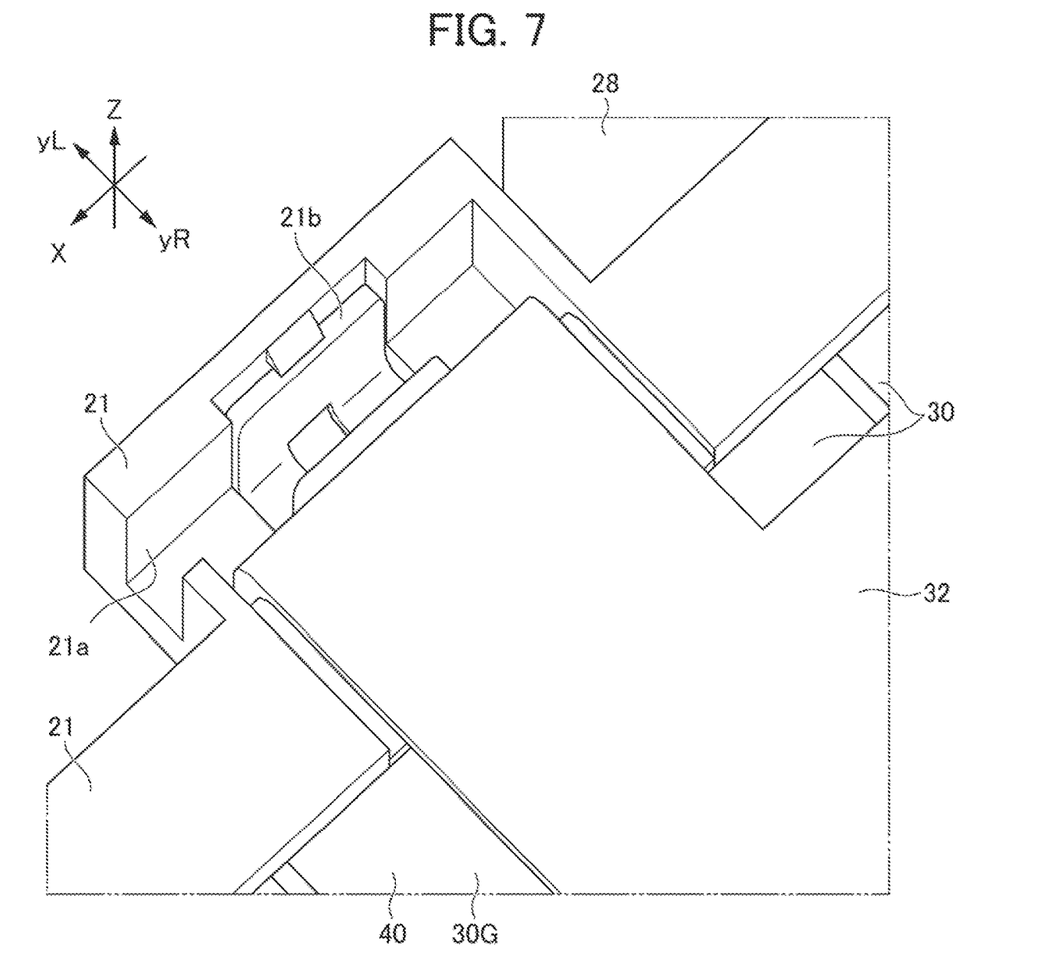
FIG. 7 is a perspective view showing a second terminal block.

FIG. 7 is a perspective view of the second terminal block 21 of the right-side cell assembly 40 viewed obliquely from above. The second terminal block 21 has an opening 21a. The opening 21a opens at least to the side of the first terminal block 12 and upwards. The U-shaped second connection member 21b in a front view seen in the front/rear direction X is provided inside of the second terminal block 21. The second connection member 21b is electrically connected to the second bus bar 32, by abutting the second bus bar 32.

Figure 8:
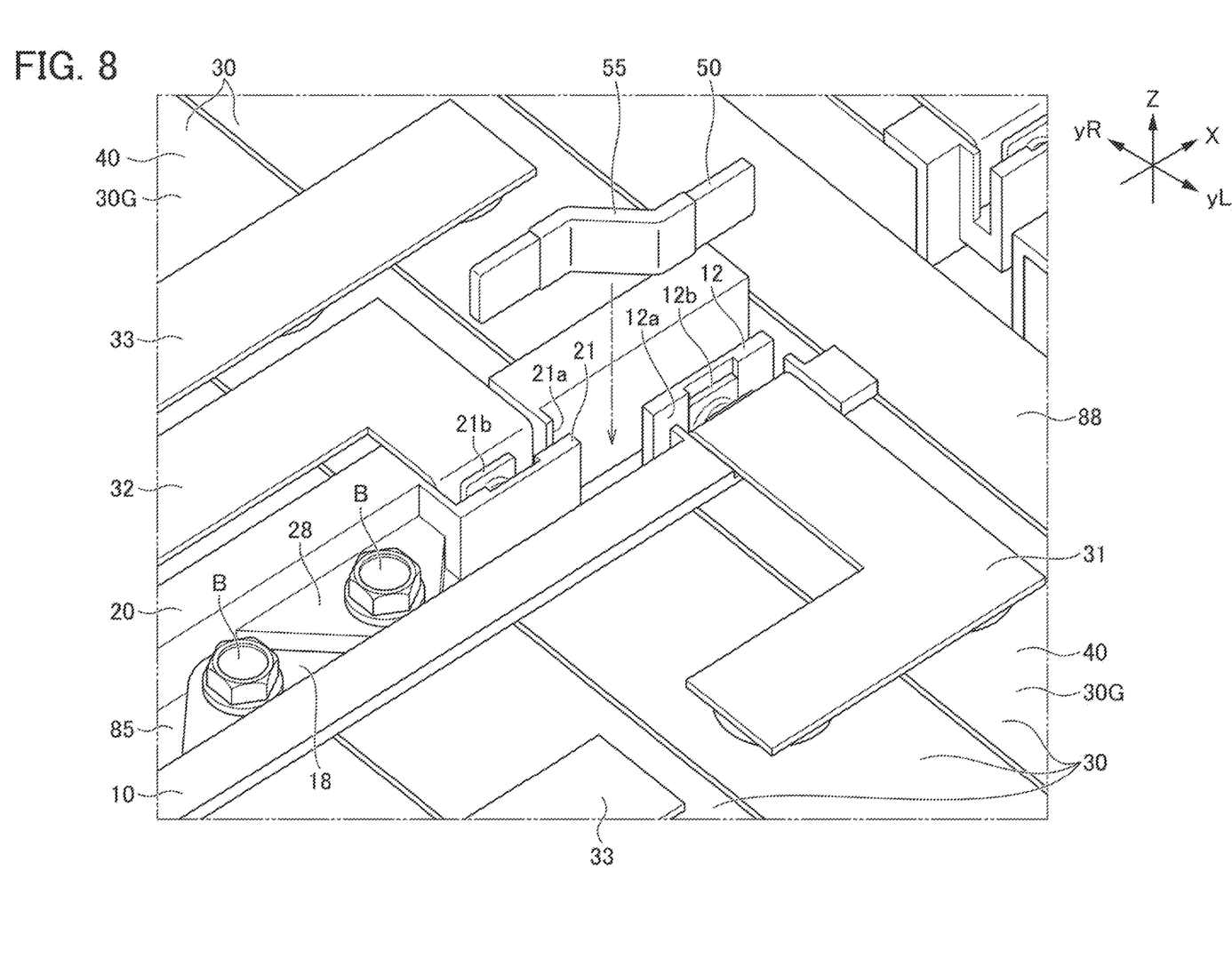
FIG. 8 is an exploded perspective view showing an electrical connection portion of adjacent cell assemblies.

FIG. 8 is an exploded perspective view seeing the electrical connection portion of adjacent cell assemblies 40 in the left/right direction Y and the vicinity thereof from obliquely above on the front/rear opposite side than the case of FIG. 7.

The first terminal block 12 has an opening 12a, and the first connection member 12b is installed thereto. Explanation of the first terminal block 12 is read by substituting terms in the explanation of the second terminal block 21 as follows. Namely, each one of "first" and "second" is substituted with the other, and the reference number is substituted with a corresponding one.

The coupling bus bar 50 is a member extending in the front/rear direction X, and an insulation cover 55 is fit onto a central part in the length direction. The coupling bus bar 50 is inserted inside of the first terminal block 12 and second terminal block 21, from the upper side of the openings 12a, 21a of the first terminal block 12 and second terminal block 21.

Figure 9:
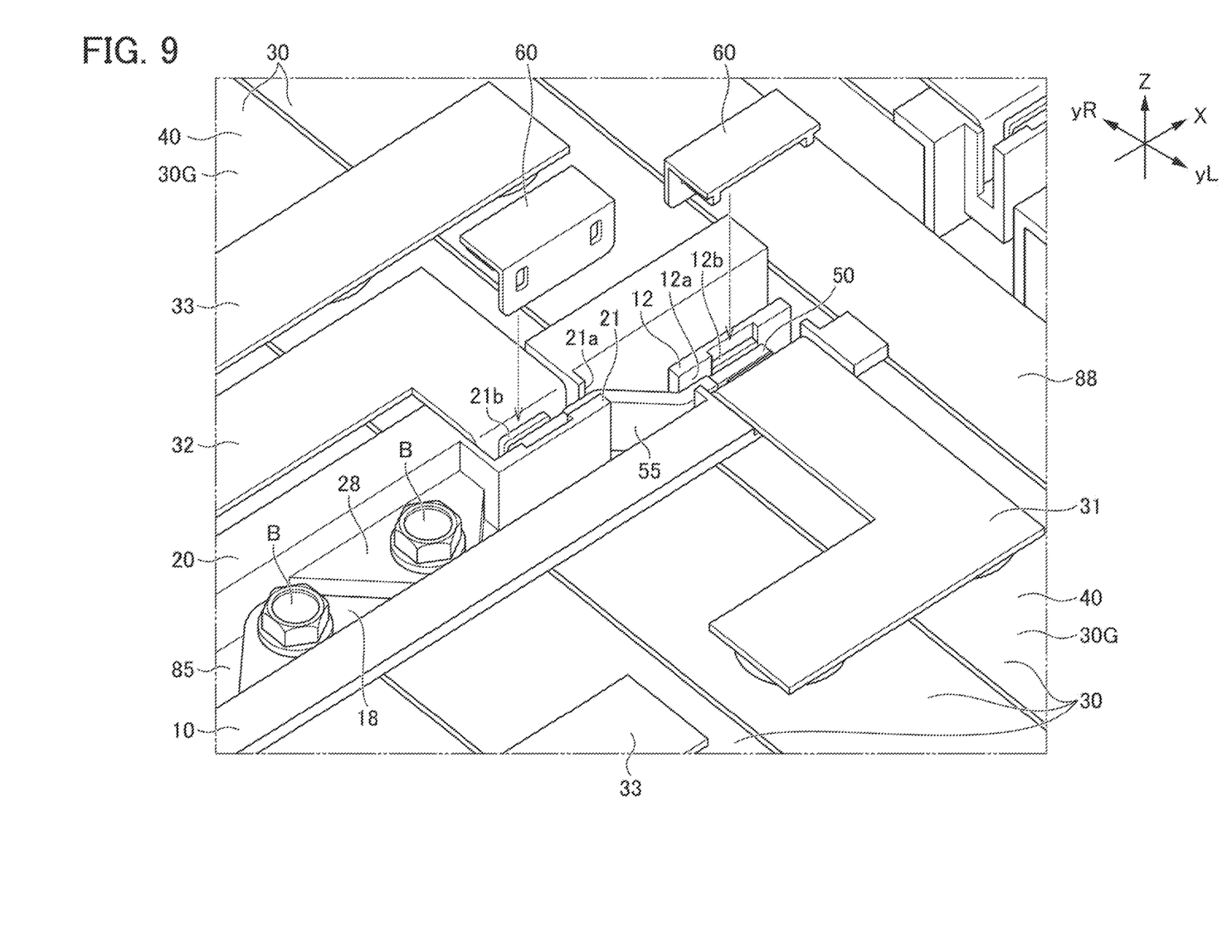
FIG. 9 is a perspective view showing the same connection portion.

FIG. 9 is a perspective view showing a state inserting the coupling bus bar 50 inside of the first terminal block 12 and second terminal block 21. By one end abutting the first connection member 12b and the other end abutting the second connection member 21b, the coupling bus bar 50 electrically connects the first bus bar 31 of the cell assembly 40 on the leftward yL side, i.e. right side in FIG. 9, and the second bus bar 32 of the cell assembly 40 on the rightward yR side, i.e. left side in FIG. 9. The coupling bus bar 50 thereby electrically connects the leftward yL-side cell assembly 40 and the rightward yR-side cell assembly 40 within the housing 80 and directly above the partition wall 85.

To each terminal block 12, 21, a retainer 60 serving as a bus bar retention member which is an insulator is attached combining insulation of the coupling bus bar 50 relative to the periphery of these terminal blocks 12, 21, and fall prevention of the coupling bus bar 50.

Figure 10:
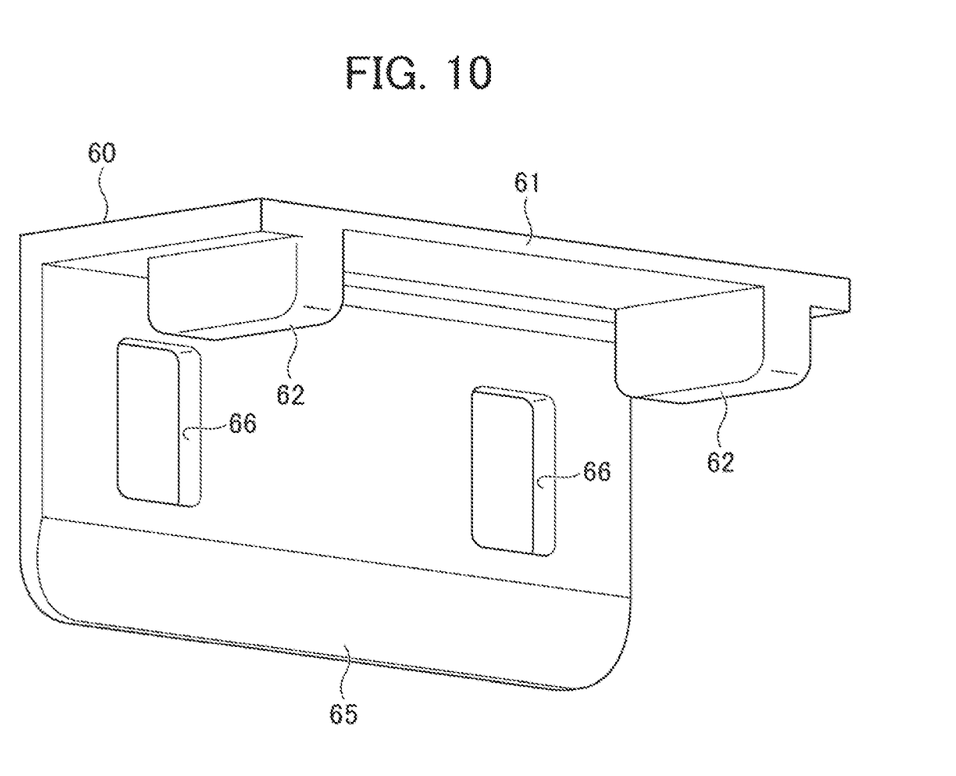
FIG. 10 is a perspective view showing a bus bar retention member.

FIG. 10 is a perspective view showing the retainer 60. The retainer 60 has a horizontal part 61 projecting inwards left and right, i.e. to the cell group 30G side, and a vertical part 65 projecting downwards from the outward ends on left/right of the horizontal part 61. At the lower face of the horizontal part 61, ribs 62 projecting downwards are arranged side-by-side at an interval in the front/rear direction X. In the vertical part 65, penetrating hole-like engagement holes 66 are arranged side-by-side at an interval in the front/rear direction X.

Figure 11:
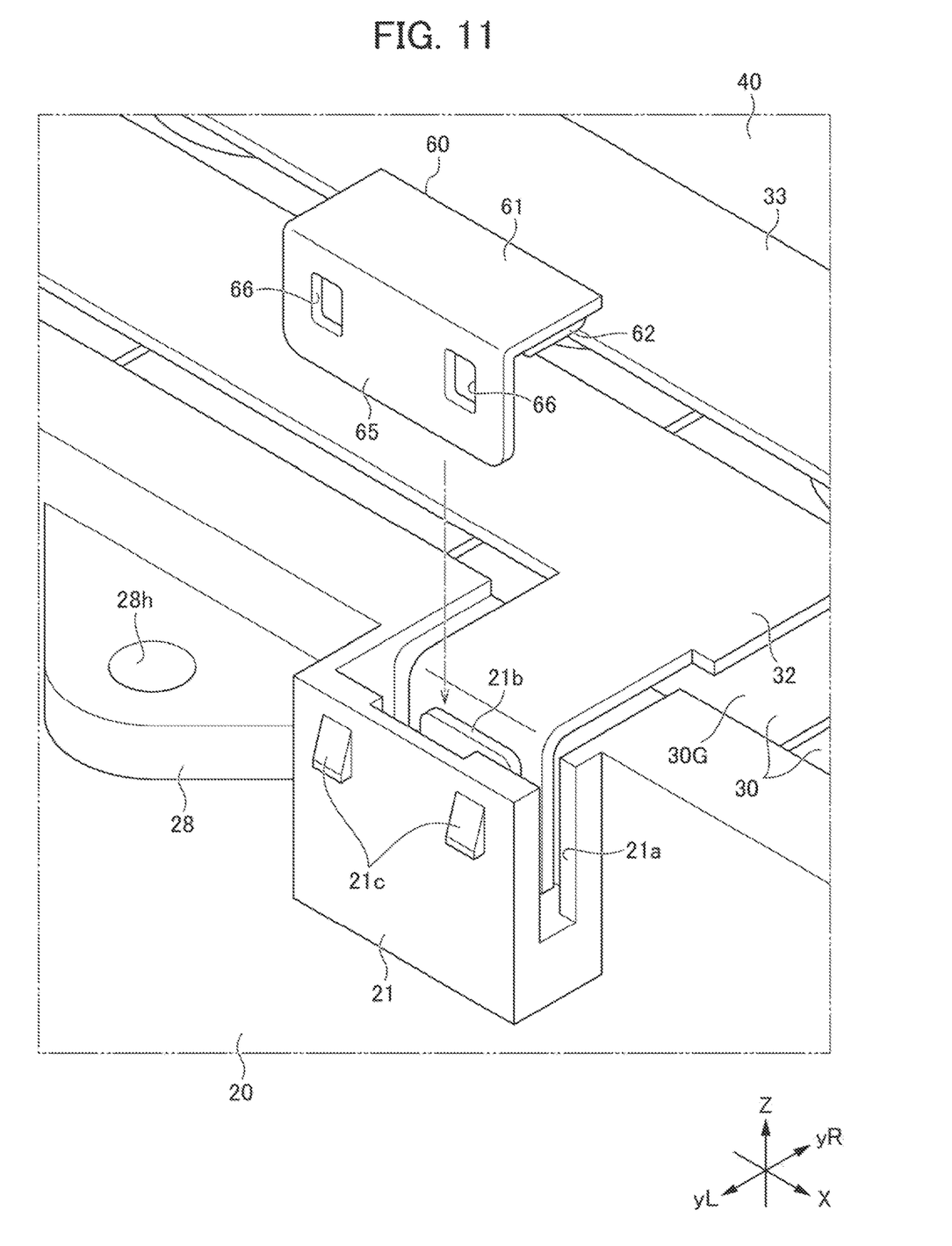
FIG. 11 is an exploded perspective view showing a bus bar retention member and terminal block.

FIG. 11 is an exploded perspective view showing the retainer 60 and periphery thereof. The terminal block 21 has snap fits 21c engaging the engagement holes 66 of the retainer 60 at a lateral face at an interval in the front/rear direction.

Figure 12:
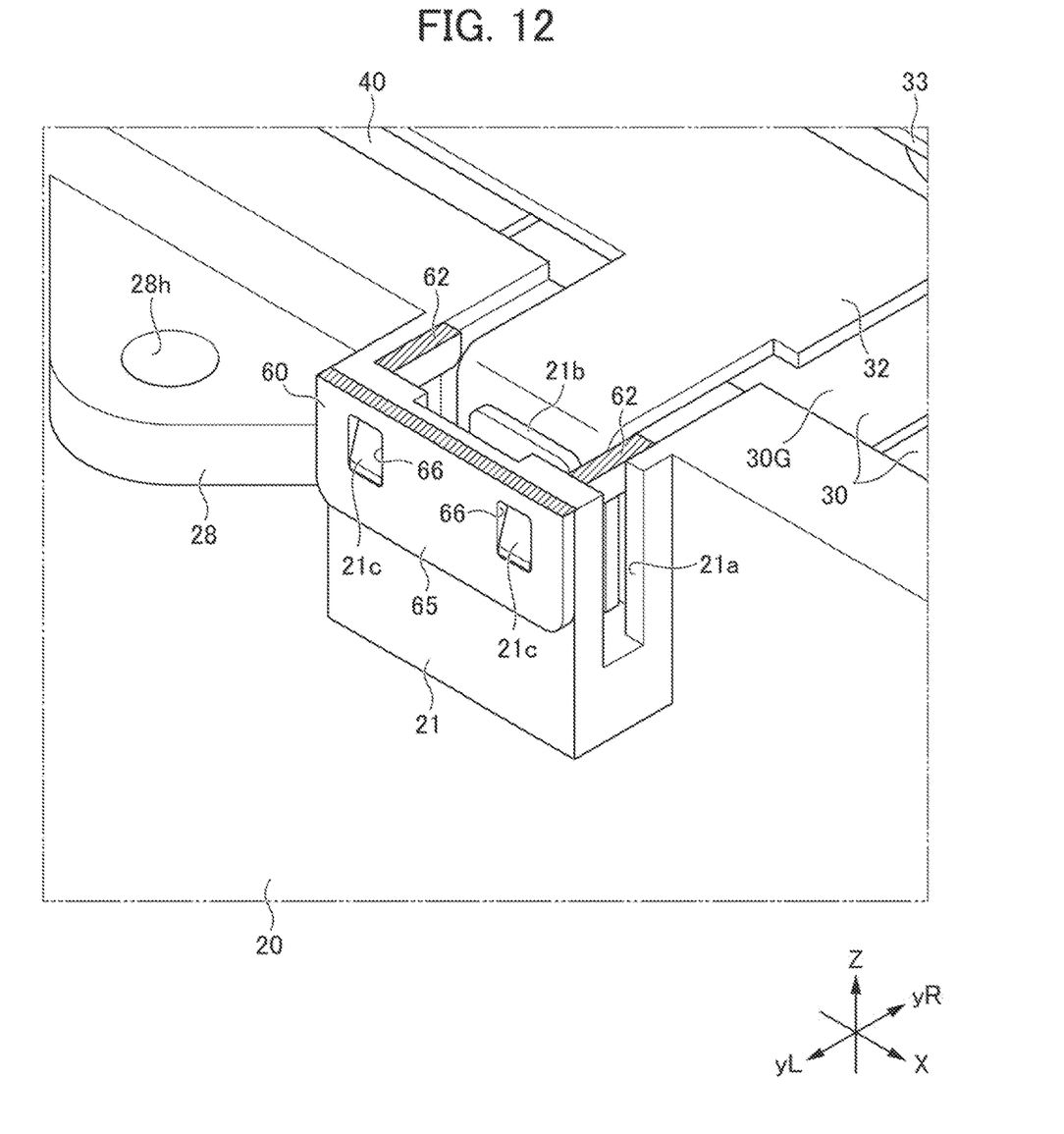
FIG. 12 is a perspective view of a partial cross section showing a bus bar retention member and terminal block.

FIG. 12 is a perspective view of a partial cross section showing a state in which the retainer 60 is attached to the terminal block 21, without the horizontal part 61. An anterior rib 62 abuts the inside face of a front side and inside faces on the left/right of the terminal block 21, and a posterior rib 62 abuts the inside face on a rear side and inside faces on the left/right of the terminal block 21, whereby the horizontal part 61 engages the upper end of the terminal block 21. In addition, together with this, by the snap fits 21c engaging each engagement hole 66, the vertical part 65 engages the outward lateral faces on the left/right of the terminal block 21.

Figure 13:
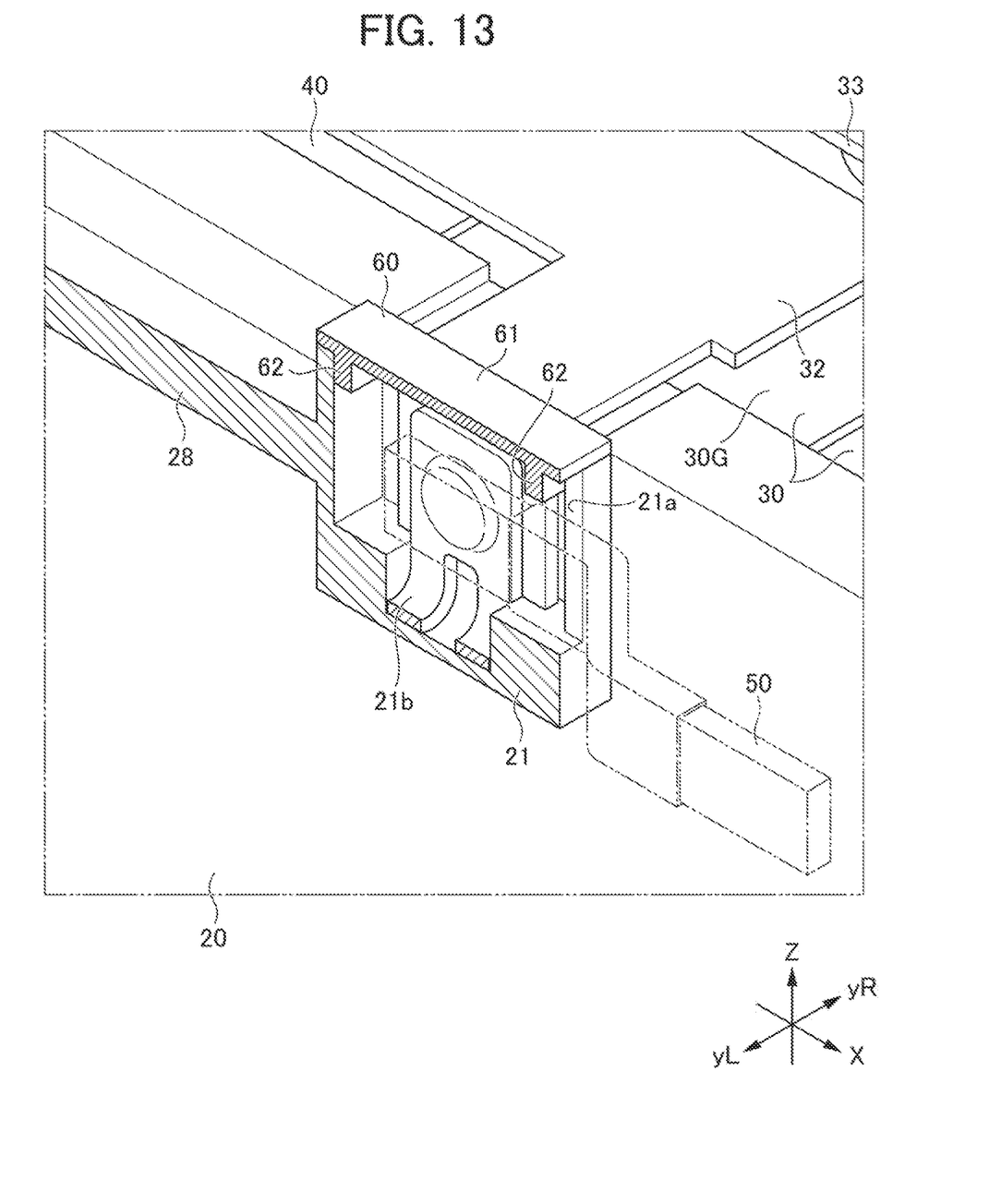
FIG. 13 is a perspective view taking a cross section of a different portion than FIG. 12.

FIG. 13 is a perspective view of a partial cross section showing a state in which the retainer 60 is attached to the terminal block 21 without the left/right outward side of the retainer 60 and terminal block 21. The horizontal part 61 insulates the coupling bus bar 50 from the periphery of the terminal block 21, by covering the end in the extending direction of the coupling bus bar 50 from above. The rib 62 prevents falling off of the coupling bus bar 50, by abutting from the upper side the coupling bus bar 50.

According to the present embodiment shown above, it is possible to improve the productivity and quality of the battery pack 100, and improve the mounting efficiency of the cell assembly 40 to the housing 80. The details thereof will be explained below.

By attaching the plates 10, 20 to a lateral face of each cell group 30G, the plurality of battery cells 30 are connected by the plates 10, 20. For this reason, compared to a case not connected, it is possible to efficiently perform assembly of the cell group 30G to the housing 80. Moreover, due to being assembly by adhesive, double-sided tape or the like, it is possible to carry out easily.

Furthermore, due to interposing the shim 39 between one end in the front/rear direction X of the cell assembly 40 and the inner wall of the installation space S, it is possible to position and retain the cell assembly 40 in the front/rear direction X by the shim 39.

Moreover, by having the flanges 13, 23 of the plates 10, 20 abut the upper face of the cell group 30G, and fastening the fixed parts 18, 28 of the plates 10, 20 to the upper face of the partition wall 85, it is possible to position and retain the cell assembly 40 in the up/down direction Z.

Furthermore, due to having the protrusions 15, 25 projecting left/right outwards at the left and right plates 10, 20 respectively, upon inserting the cell assembly 40 in the installation space S, it is possible to secure the gap g between the plates 10, 20 and the partition wall 85 by these protrusions 15, 25, and possible to center the cell group 30G in the left/right direction Y. In this state, by pouring the paste P in the gap g between the partition wall 85 and cell group 30G, it is possible to prevent a situation, for example, in which the gap g more to one side in the left/right direction than the cell group 30G is filled with the paste P with a large thickness in the left and right direction Y at a low density, and the gap g more to the other side in the left/right direction than the cell group 30G is filled with the paste P with a small thickness in the left and right direction Y at a high density. For this reason, it is possible to position and retain the cell assembly 40 with good balance in the left/right direction Y.

Moreover, since the injection channel 90 is provided in the partition wall 85, it is possible to efficiently pour the paste P in the gap g between the partition wall 85 and cell group 30G. Furthermore, since the injection port 91 is in the upper face of the partition wall 85, access from the injection equipment is favorable. Moreover, upon attaching a lid to the housing main body 80a, since the injection port 91 is covered by this lid, protection of the injection port 91 is also favorable. Additionally, since the inlet 99 is in the lower part or lower end of the partition wall 85, it is possible to actively lead the paste P to the back of the gap g. For this reason, it is possible to make the paste P uniform by efficiently evacuating the air inside the gap g.

Moreover, since the cell assembly 40 is positioned and retained in the respective directions X, Y, Z in the above way, after assembly of the cell assembly 40 to the housing 80, there is no particular problem even if adhesion of the plates 10, 20 to the cell group 30G peels away. For this reason, this adhesion is sufficient even if simple adhesion.

Furthermore, each cell assembly 40 is not a so-called "end plate" at both ends in the front/rear direction X. For this reason, compared to a case of providing a terminal block at the end plate, it is possible to make the cell assembly 40 compact in the front/rear direction X. It should be noted that the end plate is a plate-like member positioned at both ends in the front/rear direction X of the cell group 30G in a conventional battery module. By the end plates on both ends being connected in the front/rear direction X by a metallic bind bar, force in the front/rear direction X is applied to the cell group 30G and the cell group 30G is retained.

In addition, in the present embodiment, the first terminal block 12 of the left-side cell assembly 40 and the second terminal block 21 of the right-side cell assembly 40 within the housing 80 project directly above the same partition wall 85, and the coupling bus bar 50 electrically connects the first bus bar 31 of this first terminal block 12 and the second bus bar 32 of this second terminal block 21. For this reason, effectively using the space within the housing 80 and directly above the partition wall 85, it is possible to electrically connect adjacent cell groups 30G in the left/right direction Y.

Furthermore, at this time, since the first terminal block 12 and second terminal block 21 are shifted in the front/rear direction X, it is possible to avoid interference between the first terminal block 12 and second terminal block 21, and make adjacent cell assemblies 40 in the left/right direction Y to approach more in the left/right direction Y. For this reason, it is possible to thin the partition wall 85, and possible to pack and arrange the plurality of cell assemblies 40 in the left/right direction Y.

Moreover, since the terminal blocks 12, 21 are formed in the plates 10, 20, it is possible to reduce the number of parts compared to the case of the terminal blocks 12, 21 being separate members than the plates 10, 20.

In addition, each terminal block 12, 21 has an opening 21a which opens upwards and towards the partnering terminal block 21, 12. For this reason, by simply plugging in the coupling bus bar 50 to both terminal blocks 12, 21 from the upper side of both openings 12a, 21a, it is possible to simply assemble the coupling bus bar 50 to both terminal blocks 12, 21.

Furthermore, the retainer 60 of the insulator covering the openings 12a, 21a is attached to the terminal blocks 12, 21. For this reason, it is possible to insulate the coupling bus bar 50 from the periphery of the terminal blocks 12, 21 by the retainer 60, and prevent falling out of the coupling bus bar 50.

In the above way, it is possible to improve the productivity and quality of the battery pack 100, and improve the mounting efficiency of the cell assembly 40 to the housing 80.

Other Embodiments

The embodiments shown above can be modified as follows, for example. In the case that there is no particular problem in insulation and retention of the coupling bus bar 50 even when installing the retainer 60 to only one among the first terminal block 12 and second terminal block 21, it may be configured so as to install the retainer 60 to only this one.

EXPLANATION OF REFERENCE NUMERALS 10 first plate
12 first terminal block
12a opening
13 first flange
15 first protrusion
18 first fixed part
20 second plate
21 second terminal block
21a opening
23 second flange
25 second protrusion
28 second fixed part
30 battery cell
30G cell group
31 first bus bar
32 second bus bar
40 cell assembly
50 coupling bus bar
60 retainer as bus bar retention member
80 housing
90 injection channel
91 injection port
99 inlet
100 battery pack
P paste

What is claimed is:

1. A battery pack comprising:
a housing having inside thereof a partition wall extending in an extending direction and projecting in a projecting direction which is orthogonal to the extending direction;
a cell group having side-by-side in the extending direction a plurality of battery cells on a side of the partition wall;
paste filled into a gap between the partition wall and the cell group; and
a plate extending in the extending direction along a lateral face of the cell group,
wherein the partition wall includes an injection channel having an injection port for injecting the paste, and an inlet which communicates with the injection port and opens to the gap, and wherein the plate includes a flange abutting an end face of a plurality of the battery cells on a side in the projecting direction, and a fixed part which is fixed to an end face of the partition wall on a side in the projecting direction.

2. The battery pack according to claim 1, wherein the injection port is provided at an end face on a side in the projecting direction of the partition wall, and the inlet is provided more to an opposite direction side of the projecting direction than a center in the projecting direction of a wall face of the partition wall on a side of the cell group.

3. The battery pack according to claim 1, wherein the plate includes at intervals in the extending direction a plurality of protrusions projecting to a side of the partition wall within the gap.

4. The battery pack according to claim 1, wherein the plate connects the battery cells by being attached to a lateral face of the plurality of the battery cells.

\* \* \* \* \*